United States Patent [19]
Bonne

[11] 4,002,371
[45] Jan. 11, 1977

[54] VARIABLE TRACK VEHICLE WHEEL

[75] Inventor: Jean-Claude Bonne, Eaubonne, France

[73] Assignee: Acieries de Gennevilliers Anciens Ets. C. Delachaux, Gennevilliers, France

[22] Filed: Apr. 21, 1975

[21] Appl. No.: 569,774

[30] Foreign Application Priority Data
Apr. 29, 1974 France .............................. 74.14817

[52] U.S. Cl. ............................ 301/9 TV; 24/263 A
[51] Int. Cl.² ....................................... B60B 23/12
[58] Field of Search ................ 301/9 TV, 9 S, 100, 301/122, 111, 128, 9 DH, 9 DN; 24/263 A, 263 FS

[56] References Cited
UNITED STATES PATENTS

| 1,504,689 | 8/1924 | Hale | 301/9 TV |
| 2,702,724 | 2/1955 | Nordenson | 301/9 TV |
| 2,942,915 | 6/1960 | Kremkow | 301/9 TV |
| 3,586,381 | 6/1971 | Siegel | 301/9 TV |

Primary Examiner—Robert B. Reeves
Assistant Examiner—H. Grant Skaggs
Attorney, Agent, or Firm—Michael Klotz

[57] ABSTRACT

A variable track wheel for example for agricultural tractors includes a wheel disc having peripherally spaced connections between it and helical rails secured to a wheel rim, each connection comprising two jaws, one secured to the disc and the other, being movable, is connected to the first jaw by a screwed connection. The jaws are arranged to be clamped to a portion of a helical rail and during clamping the movable jaw moves radially outwardly.

5 Claims, 7 Drawing Figures

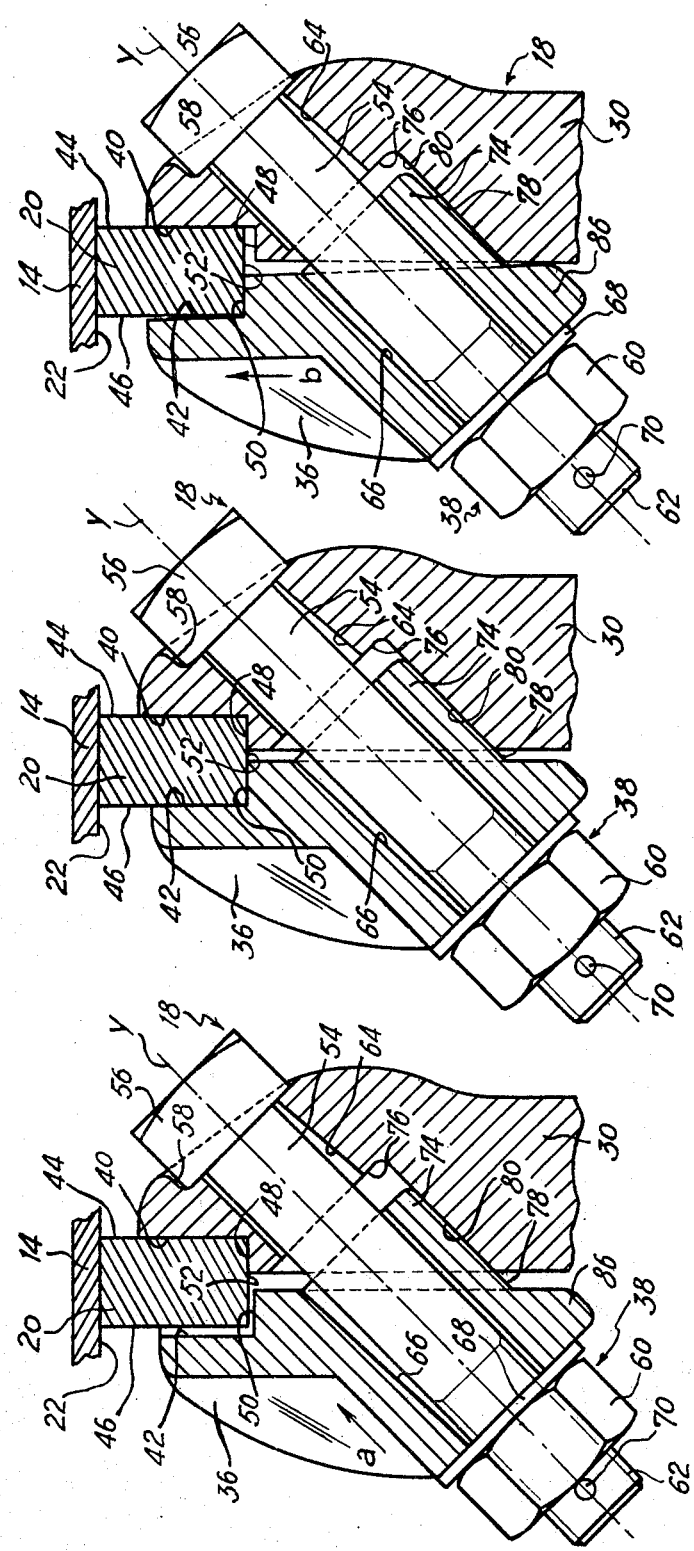

VARIABLE TRACK VEHICLE WHEEL

BACKGROUND OF THE INVENTION

1. Field of the Invention

This invention relates to mounting devices for connecting a part of a wheel disc to a helical rail secured to a wheel rim. The invention is of particular application to variable track wheels of agricultural vehicles, such wheels being so devised that the vehicle track can be altered on site for adaptation to particular requirements, for example dictated by the cultivation of crops.

2. Description of the Prior Art

In one of the commonest systems, each wheel has a wheel disc fittable to a wheel shaft, a tyred rim and a number of mounting devices connecting regions distributed in spaced relationship around the disc periphery to helical rails secured to the rim inner wall. The mounting devices used for this kind of wheel usually take the form of a rigid stirrup secured to the disc periphery by means of a radially adjustable connection enabling the stirrup to be urged into engagement with the corresponding helical rail. Since the axial position of the rim relative to the disc is altered with the wheel already positioned on the vehicle, proper adjustment of the various connections was a difficult matter because of vehicle weight, and consecutive adjustments of the wheel caused it to go out of true, with possible difficulties for on-road travel. When the radial adjustment of the connection is accompanied by slight axial displacement of the stirrup relatively to the disc, the out-of-roundness causes wheel buckling in the sense that the rim axis ceases to be dead parallel to the disc axis. Such buckling leads, inter alia on road surfaces, to heavy tyre wear.

Other suggestions, as disclosed by United Kingdom Patent Specification No. 755,301, are for mounting devices of the kind each comprising two co-operating jaws, the first jaw being rigidly secured to the disc periphery at the region concerned while the second jaw is movable and connected to the first jaw by an adjustable screwed connection enabling the jaws to clamp the rail between them at the chosen region. Since in this case the adjustment of rim centring on the disc is the result of co-operation between mating inclined surfaces on the rail and the stationary jaw, the action of clamping the jaws is accompanied by radial and axial movement of the mounting device relatively to the rail; clearly, therefore, none of the disadvantages mentioned is obviated. Also, the helical rail for use with such a facility must be of trapezoidal cross-section, and it is a delicate matter to make up and/or secure such a rail to the rim inner wall. Since the present normal construction entails the use of a rectangular cross-section rail, such a device is fundamentally unsatisfactory since it would lead to bruising or hammering and rapid deterioration either of the rail to which it was clamped or of the fixed jaw, with the result of undesirable backlash.

SUMMARY OF THE INVENTION

This invention relates to a mounting device of use with rims having standard rails and adapted to reduce the risks of out-of-roundness and buckling associated with a track alteration.

According to one aspect of the present invention a mounting device for connecting a region of a wheel disc periphery to any part of a helical rail secured to an inner wall of a wheel rim so that the axial relation between the rim and the disc can be varied comprises first and second co-operatable jaws, the first jaw being rigidly secured to a support which is adapted to be secured to the wheel disc while the second jaw is movable relatively to the first jaw and is connected thereto by an adjustable screwed connection enabling the jaws to clamp the rail between them, each of the jaws having a shoulder adapted to co-operate with the rail, and the screwed connection being so devised that the action of clamping the jaws to the rail is accompanied by a radially outward movement of the moving jaw.

Advantageously, the helical rail for mounting on the rim inner wall can then be of normal shape — i.e., of rectangular cross-section. The disc-mounted jaw can always bear on the corresponding rail flank irrespective of the setting of the screwed connection and so maintains the rim and disc axes parallel with one another and thus prevents any buckling or warping of the wheel. When the screwed connection is slackened to alter the track, the shoulder of the fixed jaw abuts the bearing surface of the rail so that any out-of-roundness occurring during subsequent tightening of the screwed connection remains relatively slight. This limitation of out-of-roundness stays the same for subsequent adjustments.

Preferably, a nesting connection is provided between the two jaws so as to guide the moving jaw on the other jaw in the required radial direction. In particular, a nesting connection of this kind helps to oppose pivoting of the moving jaw relatively to the fixed jaw around the axis of the adjustable screwed connection, so that the moving jaw can form, in parallel with the fixed jaw, an effective abutment for the end-of-course rider adjustably mounted on the rail.

According to a specific aspect of the present invention a variable track vehicle wheel comprises a wheel disc fittable to a wheel shaft, a tyred rim having an inner wall and a number of mounting devices connecting spaced peripheral regions of the disc periphery to helical rails secured to the said inner wall, each mounting device comprising first and second co-operating jaws, the first jaw being rigidly secured to the disc periphery at one of said peripheral regions while the second jaw is movable and is connected to the first jaw by an adjustable screwed connection enabling the jaws to clamp one of said helical rails between them at the said one region, each of the jaws of each mounting device having a shoulder adapted to co-operate with a bearing surface of the rail; and the screwed connection of each device being so devised that the action of clamping the jaws to the rail is accompanied by a radially outward movement of the second jaw to bring the said shoulder thereof into abutting relationship with the rail.

DESCRIPTION OF THE DRAWINGS

The invention may be carried into practice in various ways but one specific embodiment will now be described, by way of example, with reference to the accompanying drawings, wherein:

FIGS. 5-7 are partial views, in section on the line V—V of FIG. 4, showing the respective consecutive positions of the two jaws of the device according to the invention as the adjusting screwed connection is tightened.

DESCRIPTION OF THE PREFERRED EMBODIMENT

Figure 1:
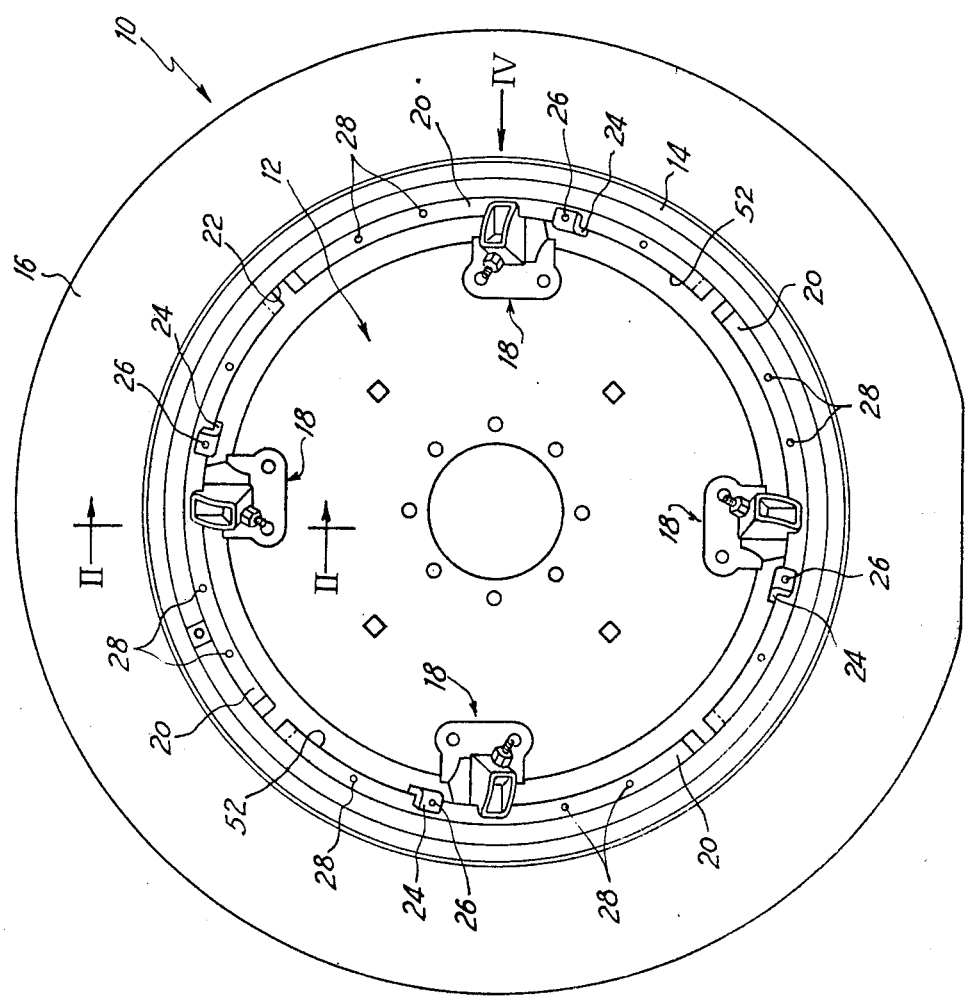
FIG. 1 is a diagrammatic side elevation of a variable track wheel according to the invention.

FIG. 1 shows a variable track wheel 10 of use more particularly on an agricultural tractor as a means of enabling the user to vary the track of his vehicle to suit circumstances.

In general, the wheel comprises a wheel disc 12 adapted to be mounted conventionally on a vehicle wheel shaft or axle (not shown), a rim 14 having a tyre or similar device 16, and a number, four in the embodiment shown, of mounting devices 18 connecting four peripherally spaced areas of the disc periphery to four helical rectangular cross-section rails 20. The rails are secured in known manner, e.g. by welding, to an inner wall 22 of the rim 14. Each device 18 co-operates with a single rail 20 and normally bears peripherally on an end-of-travel rider 24 which is releasably mounted on rail 20 by means of a bolt or similar demountable pin or spindle or the like 26 engaged in one of a number of apertures 28 in the rail 20.

In the example shown there are four mounting devices 18 and they are distributed in a regular spaced relationship around the disc periphery. More devices 18 could be used (there must be a minimum of three) and/or the devices 18 can be arranged on the disc irregularly, subject to the rim 14 having a corresponding number and/or arrangement of helical rails 20 on its inner wall 22.

Figure 3:
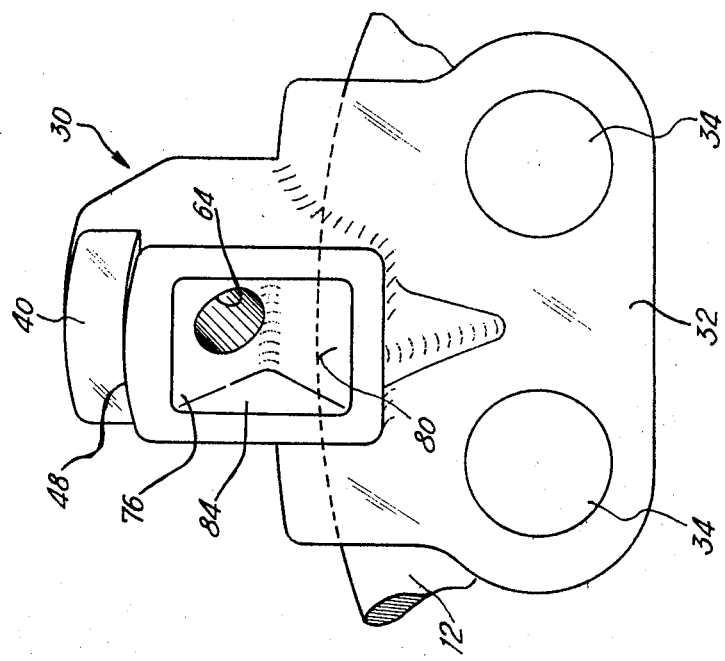
FIG. 3 is a view in elevation of the fixed jaw.
Figure 2:
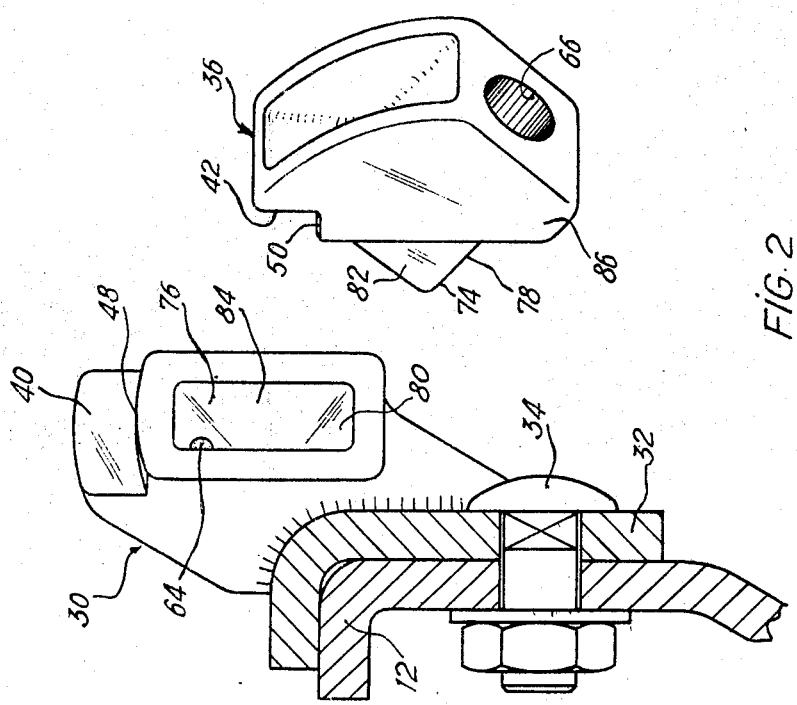
FIG. 2 is a detail view on an enlarged scale, on the line II—II of FIG. 1, showing the two jaws of a mounting device before assembly.
Figure 4:
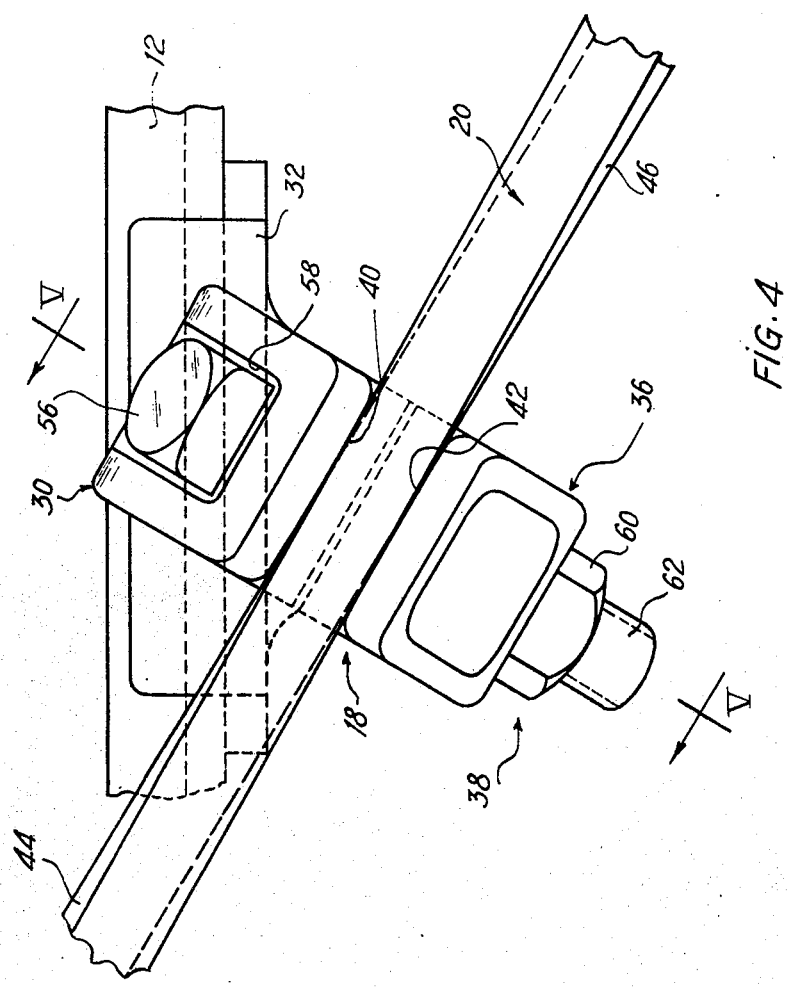
FIG. 4 is a partial end view, to an enlarged scale and looking in the direction of an arrow IV of FIG. 1, of the device according to the invention after removal of the rim.

Referring now more particularly to FIGS. 2 to 4, each device 18 basically comprises a relatively stationary jaw 30 rigidly secured to a support 32 adapted to be secured to the required place on the disc periphery by any known means, such as two bolts 34, visible in FIG. 2, a jaw 36 which can move relatively to the first jaw 30 and which is disposed on the accessible side of the outside of the jaw 30 so that the device 18 can be adjusted and demounted, and a screwed connection 38 which can be seen in FIG. 4 and which interconnects the first jaw 30 and second jaw 36 so that between them they can clamp the required portion of the corresponding rail 20 in a manner which will be described.

Preferably, each jaw 30, 36 is a casting for economy reasons and has a bearing surface 40, 42 respectively, engageable with one of the substantially parallel opposite flanks 44, 46 of the rail 20, and an outwardly facing shoulder 48, 50 respectively adapted to co-operate with rail bearing surface 52 (see FIG. 1).

The connection 38 is of the kind comprising a screw and a nut and extends through the two jaws 30, 36 along an axis Y which is inclined relatively to the clamping direction as defined by the perpendicular to the surfaces 40 and 42, so that tightening the connection 38 moves the jaws 30, 36 towards one another and moves the moving jaw 36 radially towards the outside of the disc 12 relatively to the stationary jaw 30. Preferably, the inclination of the axis Y to the perpendicular to the surfaces 40 and 42 is approximately 45°, so that the tightening or clamping force is distributed half as a force tending to bring the surfaces 40, 42 towards one another and half as a force tending to produce the outward movement of the jaw 36.

As shown, the connection 38 can take the form of a bolt 54 having a widened head 56 which is square or of some similar shape and which is received to at least some extent in a matching recess 58 in the jaw 30, and a nut 60 screwed to the free end 62 of the bolt 54. The bolt 54 extends consecutively through an aperture 64 in the jaw 30 and through an aperture 66 of the same diameter in the jaw 36, then extends to the outside and receives on its end 62 a stop or abutment washer 68, the nut 60 and a pin 70 (visible in FIGS. 5-7) for limiting elongation of the connection 38 i.e., for limiting the distance between the nut 60 and the head 56. The apertures 64, 66 are of slightly greater diameter than the bolt 54 so as to allow some sliding of the jaws relatively to one another.

Advantageously, there is a nested engagement between the jaws so that the moving jaw 36 can be guided in its radial movement on the stationary jaw 30. The nested engagement in the embodiment shown takes the form of a prismatic projection or protuberance or the like 74 formed in the central portion of the moving jaw 36 and adapted to engage in a recess 76 of matching prismatic shape in the stationary jaw 30. The protuberance 74 has an inclined plane surface 78 which is substantially parallel to the axis Y and which co-operates with a corresponding surface 80 of the recess 76 to guide the moving jaw 36 in the direction indicated by arrow a (see FIG. 5) when the connection 38 starts to be tightened. The parallel flanks 82 (see FIG. 2) of the protuberance 74 co-operate with the parallel and facing surfaces 84 of the recess 76 to guide the moving jaw 36 just in the radial plane containing the axis Y of the connection 38. Clearly, this kind of guiding enables the jaw 36, like the jaw 30, to serve as an effective abutment for the end-of-travel rider 24, the nesting feature 74, 76 opposing pivoting around the axis Y.

To vary the axial separation between the disc 12 and the rim 14, the connections 38 are slackened consecutively by loosening of the nuts 60. Each rail bears on the shoulder 48 of the stationary jaw, subject to the maximum spacing between the jaws 30 and 36 as defined by the pin 70 being small enough to preclude any possibility of the bearing surface 52 escaping from the shoulder 48 during the alteration operation.

After the riders 24 have been moved, the vehicle engine is used to rotate the disc 12 relatively to the rim 14 so as to modify the axial position thereof in the light of the helical shape of the rails 20. After the devices 18 have been placed in the required position in abutting relationship with the riders 24, the connections 38 are tightened progressively. Engagement of the surfaces 40 of the fixed jaws 30 with the flanks 44 of the corresponding rails maintains the disc and rim axes parallel to one another — i.e., precludes any risk of buckling. The biasing in the radial direction at the end of clamping of the jaws 36 (arrow b in FIG. 7) leads first to engagement of the rail bearing surface 52 by the shoulder 50 of the jaw 36 and then to the loading of such surface by such jaw. Since the clearance to be taken up on the rim 12 — i.e., the maximum average separation between the shoulders 48 and 50 — remains small, e.g. less than 2 mm, out-of-roundness resulting from unequal tightening of the various connections 38 remains very small.

Co-operation between the surface 78 of the protuberance 74 and the adjacent surface 80 of the recess 76 is operative only at the start of tightening (see FIG. 6) and what permits subsequent outwards movement of the jaw 36 (arrow b in FIG. 7) when the connection 38 is tightened is basically the fact that the bottom part 86 of the jaw 36 abuts the jaw 30 after a slight pivoting movement thereon.

The invention is not of course limited to the embodiment described and shown. The wheel can have any number of mounting devices, as 18, in any required distribution around the periphery. The connection between the jaws 30 and 36 of each device 18 can be other than the screw-and-nut device shown. More particularly, the bolt 54 can be screwed into a tapped aperture in the stationary jaw 30, the head of the bolt 54 bearing on the moving jaw 36. The shoulders 48 and 50 can be of different sizes. The nesting feature 74, 76 can be of any kind providing guidance of the moving jaw in the required radial direction. For instance, the feature could be embodied by the moving jaw 36 having two parallel arms or flanges or the like adapted to frame the flanks of the stationary jaw 30. The same could be directly welded to the periphery of the disc 12 instead of being secured thereto through the agency of the integers 32 and 34. However, it is advantageous to use the integers 32, 34 since it then becomes possible to replace a damaged or broken mounting device.

What I claim as my invention and desire to secure by Letters Patent is:

1. Adjustable tread wheel comprising a rim provided on its inner surface with a plurality of helical guide rails, each rail having a pair of flanks and an axially extending bearing surface, a wheel disc carrying a plurality of clamping devices each adapted to cooperate with a guide rail for connecting the wheel disc to the rim in any given relative axial position, each clamping device comprising a fixed jaw secured to the disc, a movable jaw, each jaw having a bearing surface for engagement with the facing flank of the corresponding guide rail and a radial shoulder for engagement with the bearing surface of the guide rail, and a screw and nut assembly extending in a hole provided in each jaw, for urging the movable jaw towards the fixed jaw to clamp the guide rail therebetween, the axis of the screw being inclined with respect to the bearing surface of the guide rail so that the tightening of the screw and nut assembly results in a relative outward radial displacement of the movable jaw and the rail engaged thereby.

2. Adjustable tread wheel according to claim 1, in which the axis of the screw is inclined at an angle of approximately 45° to the bearing surface of the guide rail of the jaws.

3. Adjustable tread wheel according to claim 1 in which the two jaws define between them a nesting connection so as to guide the second jaw on the first jaw in the required radial direction.

4. Adjustable tread wheel according to claim 3, in which the nesting connection is provided by a projection on one of the first and second jaws, the projection being adapted to engage in a mating recess in the other of the first and second jaws.

5. Adjustable tread wheel according to claim 1 in which the screw and nut assembly comprises a screw having a polygonal head received in a corresponding recess in one of the first and second jaws, and a nut at the end of the screw to bear on the other jaw.

* * * * *